(No Model.)
C. HELLEBUSH.
MOLD FOR CLOCK CASES.
No. 369,337. Patented Sept. 6, 1887.
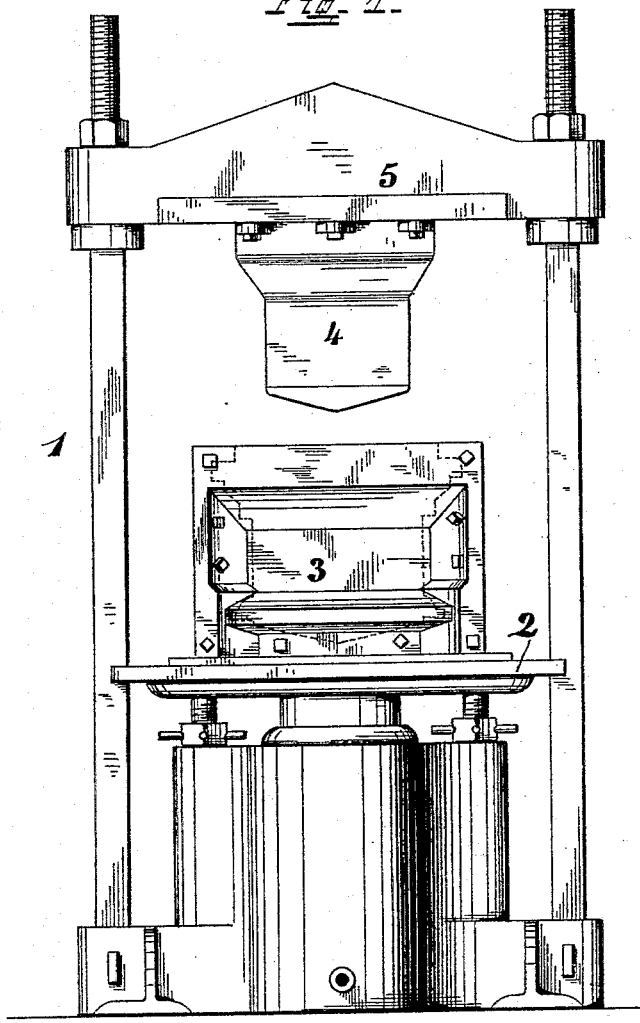
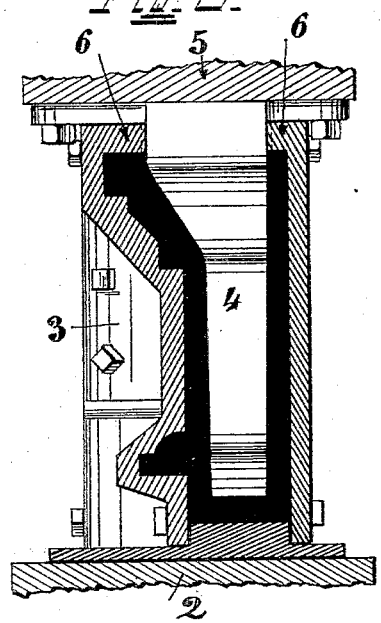
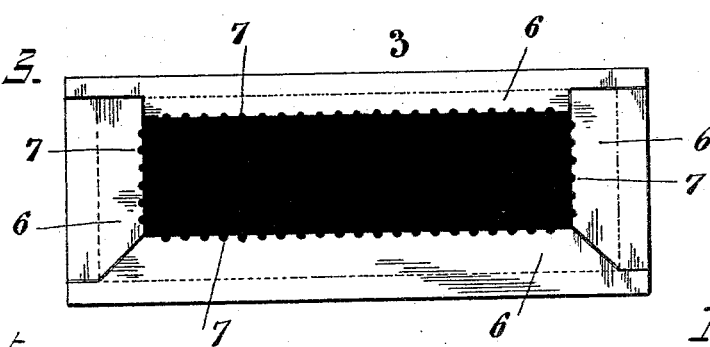
Attest
Aaron E. Moore
A. H. Kerkhoff
Inventor
Clemens Hellebush
by Carl Spengel his Atty.

UNITED STATES PATENT OFFICE.

CLEMENS HELLEBUSH, OF CINCINNATI, OHIO.

MOLD FOR CLOCK-CASES.

SPECIFICATION forming part of Letters Patent No. 369,337, dated September 6, 1887.

Application filed August 12, 1886. Serial No. 210,736. (No model.)

*To all whom it may concern:*

Be it known that I, CLEMENS HELLEBUSH, a citizen of the United States, residing at Cincinnati, Hamilton county, State of Ohio, have invented certain new and useful Improvements in Molds for Clock-Cases, of which the following is a specification.

My invention relates to molds which are especially designed for molding clock-cases of paper-pulp and other similar plastic substances; and my improvement consists in improved means for effectually preventing any tearing or loosening of the compressed material in the mold while withdrawing the plunger from it, as will be fully understood from the following description, when taken in connection with the annexed drawings, in which—

Figure 1 represents a customary hydraulic press with a female mold and plunger attached thereto. Fig. 2 shows, on an enlarged scale, a cross-section of the mold and plunger in it. Fig. 3 is a top view of the female mold.

1 represents a customary hydraulic press, to the movable platen 2 of which is secured the separable mold 3.

In using this mold its inside, which is so shaped as to produce a clock-case of a given design, is partially filled with a plastic material, which is subjected to a very high pressure by a plunger, 4, secured to the stationary head-platen 5 of the press, in order to give the clock-case a very hard and finely-grained texture. At the proper time plunger 4 is withdrawn by lowering platen 2 of the press preparatory to opening the mold and removal of the pressed clock-case. The first-mentioned part of this operation—the withdrawing of plunger 4—results in most cases disastrous to the only half-dry and partially-set clock-case by loosening or tearing the lower edges of it. To overcome this serious objection I have devised a flange, 6, at the upper edge of mold 3, where the lower edges of the clock-case are located, which extends inwardly to the distance of the thickness of the walls of the clock-case and meets plunger 4 when in its lowest position in the mold. (See Fig. 2.) Grooves 7 are provided on the inner side of flange 6, to allow free exit to air and moisture forced out by the action of the press during the act of condensing the plastic material in the mold, and to allow a free inlet of air during the withdrawal. The edges 7 may be serrated or corrugated, and the grooves should be vertical, as indicated in the drawings, and extend the entire thickness of the flange 6.

It is patent that this construction keeps the plastic material in its compressed condition and prevents any loosening or tearing of it very effectually during its withdrawal from the plunger.

Later on in the process of manufacture, when the parts of the mold itself which carry the flanges 6 are taken away, those accidents mentioned above are not liable to happen any more, as the material has meanwhile sufficiently set and hardened.

I am well aware that it is not new in glass and other molds to flange the upper ends for the purpose of finishing the bottoms or tops of the articles being molded. I therefore disclaim such molds.

I am fully aware that similar devices have been constructed for corresponding purposes, and therefore do not claim my invention, broadly; but What I do claim as new, and desire to cover by Letters Patent, is as follows:

A two-part or divisible mold having a flanged upper end provided with vertical grooves 7, in combination with a plunger constructed as described.

In testimony of which invention I hereunto set my hand.

CLEMENS HELLEBUSH.

Witnesses:
 CARL SPENGREL,
 AARON E. MOORE.